United States Patent Office 3,211,631
Patented Oct. 12, 1965

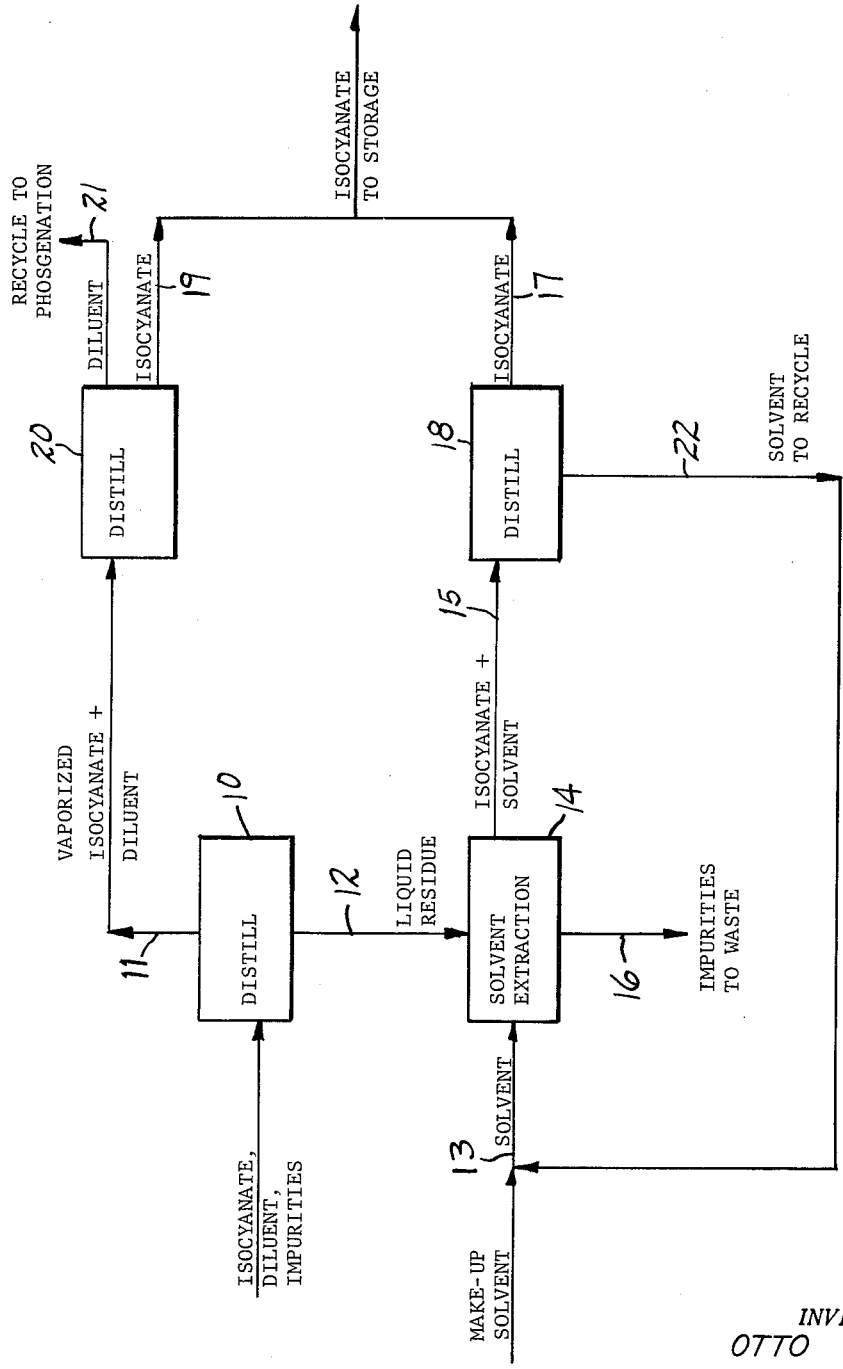

3,211,631
PURIFICATION OF ORGANIC ISOCYANATES BY LIQUID-LIQUID EXTRACTION AND DISTILLATION
Otto Fuchs, Hamden, Conn., assignor to Olin Mathieson Chemical Corporation, a corporation of Virginia
Filed Sept. 12, 1962, Ser. No. 223,272
11 Claims. (Cl. 202—60)

This invention relates to an improved process for recovering organic isocyanates from crude mixtures containing the same.

Various processes have been developed for the preparation of organic isocyanates. In one process a primary amine or amine hydrochloride is reacted with phosgene to yield the desired isocyanate. In another process other compounds which liberate phosgene during the reaction are used as a substitute for phosgene. It is also known that potassium cyanate can be reacted with an organic sulfate to yield the corresponding organic isocyanate. It has also been proposed to produce organic isocyanates by pyrolyzing an N-substituted carbamate followed by separation of the corresponding isocyanate from the pyrolyzed product before the latter has had time to reunite and form the starting N-substituted carbamate. All of these reactions can be carried out in the presence or in the absence of an inert organic liquid diluent.

Elevated temperatures are generally employed to carry out the above-mentioned reactions and/or to effect distillation of the reaction products formed by them. These elevated temperatures cause the formation of undesirable by-products such as polymerized isocyanates which are extremely difficult to separate from the organic isocyanate product. In many instances these by-products are highly viscous fluids which tend to occlude a substantial amount of the organic isocyanate product. As a result the yield of organic isocyanate recovered in these processes is usually substantially below the theoretical value.

It is the primary object of this invention to provide an improved process for producing organic isocyanates.

Another object of the invention is to provide an improved process for increasing the yield of organic isocyanates in processes for producing them.

Still another object of the invention is to provide an improved process for separating organic isocyanates from crude reaction mixtures containing them.

Another object of the invention is to provide an improved process for producing organic isocyanates in which the products of the reaction are easier to handle.

These and other objects of the invention will be apparent from the following detailed description thereof.

The above-mentioned objects, as well as those not specifically recited, are accomplished, as shown in the accompanying drawing, by first distilling 10 a crude reaction mixture containing an organic isocyanate, an inert organic liquid diluent and impurities to vaporize 11 substantially all of the inert organic liquid diluent and a portion of the organic isocyanate, and to yield a liquid residue 12 containing substantially all of the impurities and the remainder of the organic isocyanate. The residue 12 is admixed in a solvent extractor 14 with an inert liquid solvent 13 for the organic isocyanate to yield a first liquid phase 15 comprised of the organic isocyanate dissolved in the inert liquid solvent, and a second liquid phase 16 comprised of the impurities. The first liquid phase 15 is separated from the impurities in the second liquid phase 16 and the organic isocyanate 17 is separated from the first phase 15 by distillation 18. The organic isocyanate 19 obtained by separating by distillation 20 from the inert organic liquid diluent 21 is combined with the organic isocyanate 17 separated from the inert liquid solvent 22. The diluent 21 and solvent 22 may each be recovered and recycled. The yield of organic isocyanate obtained by this novel technique is substantially greater than the yield of organic isocyanate obtained by conventional distillation techniques.

The above-mentioned reactions, particularly the reaction of phosgene with a primary amine, are generally carried out in an inert liquid organic diluent. Typical examples of suitable diluents include benzene, toluene, xylene, dioxane, chlorinated hydrocarbons, for instance carbin tetrachloride, trichloroethylene, ethylene dichloride, chlorobenzenes such as 1,3-dichlorobenzene, ketone such as methyl ethyl ketone, etc., petroleum naphtha, etc., and mixtures thereof.

The resulting crude reaction product containing the inert organic liquid diluent, the organic isocyanate and dissolved impurities is subjected to one of several distillation techniques to separate substantially all of the inert organic liquid diluent and a portion, preferably a major portion, of the organic isocyanate product. Generally this separation is carried out by distilling the crude reaction product to first remove a fraction predominating in the inert organic liquid diluent, which is collected for recycling to the initial reaction. A second fraction is then separated by distillation which is comprised of a portion, preferably a major portion, of the organic isocyanate, which is collected. If desired the crude reaction mixture can be distilled to yield a fraction containing both the inert organic liquid diluent and the organic isocyanate, and this fraction, after condensing or other treatment, can then be further processed to yield a concentrate of organic isocyanate and a concentrate of inert organic liquid diluent.

After separation of the inert organic liquid diluent and a portion of the organic isocyanate, a liquid residue is produced which contains a portion, preferably a minor portion, of the organic isocyanate and substantially all of the impurities. These impurities are by-products and polymers of the organic isocyanate produced. This liquid residue, if subjected to distillation or other processing technique which involves elevated temperatures, will solidify to a brittle mass containing occluded organic isocyanate product. In accordance with this invention, the liquid residue is admixed with an inert solvent for the organic isocyanate, which causes the formation of two liquid phases. The first liquid phase contains a significant proportion of the remaining organic isocyanate dissolved in the solvent, and the second liquid phase is a highly viscous liquid predominating in the impurities and by-products of the reaction. The liquid phases are separated by decantation or other suitable technique for separating two liquid phases. The first liquid phase is then distilled to separate the organic isocyanate from the inert liquid solvent. The organic isocyanate is combined with the organic isocyanate product obtained from the first distillation step and the organic solvent is recycled.

Any inert liquid solvent can be employed that is capable of dissolving the organic isocyanate without reacting with the organic isocyanate and without dissolving a significant portion of the impurities and by-products of the reaction.

Typical examples of suitable inert liquid solvents are saturated aliphatic hydrocarbons having between 5 and about 10 carbon atoms, and petroleum ether containing between about 5 and about 10 carbon atoms. Typical examples of suitable inert liquid solvents include pentane, hexane, heptane, octane, benzene, toluene, dioxane, and the like, and mixtures thereof.

The proportion of inert organic solvent employed should be sufficient to dissolve substantially all of the organic isocyanate contained in the liquid residue. This proportion will depend upon the type of solvent employed, the type of organic isocyanate, and the degree of solubility of the organic isocyanate in the inert liquid solvent. Generally the inert liquid solvent proportion is between about 50 and about 500 percent by weight of the organic isocyanate.

The process of this invention can be utilized for the recovery of organic isocyanates generally; i.e., aliphatic, cycloaliphatic, alkyl, aryl, aralkyl, heterocyclic and aryl mono-, di- and polyisocyanates. Examples of organic isocyanates which can be recovered according to the process of this invention are hexylisocyanate, octylisocyante, dodecylisocyanate, octadecylisocyanate, tetramethylene diisocyanate, pentamethylene diisocyanate, octamethylene diisocyanate, undecamethylene diisocyanate, dodecamethylene diisocyanate, 3,3'-diisocyanato dipropyl ether, cyclohexyl isocyanate, tetrahydro-α-naphthyl isocyanate, tetrahydro-β-naphthyl isocyanate, xylene diisocyanates, diphenylmethane 4,4'-diisocyanate, β,β'-diphenylpropane 4,4'-diisocyanate, benzyl isocyanate, phenylethyl isocyanate, p-isocyanato benzyl isocyanate, phenyl isocyanate, p-cetyl phenyl isocyanate, p-dodecyl-phenyl isocyanate, 5-dodecyl-2-methylphenyl isocyanate, 3-nitro-4-dodecylphenyl isocyanate, p-cetyloxyphenyl isocyanate, metaphenylene diisocyanate, p-phenylene diisocyanate, 1-methylphenylene-2,4-diisocyanate, naphthylene-1, 4-diisocyanate, 2,4-tolylene diisocyanate, 2,6-tolylene diisocyanate, 1,3,5-benzene triisocyanate, tetrahydrofurfuryl isocyanate, and mixtures thereof.

The process of this invention can be carried out at any convenient temperature and pressure. In carrying out the process of this invention, the pressure and temperature are controlled to prevent vaporization of the impurities during the purification step while maintaining the organic isocyanate in a liquid or vapor state, as desired.

The above-mentioned isocyanates having chlorine substituents may also be treated in accordance with the process of this invention. The term "organic isocyanate" used throughout the description and claims is intended to include organic isocyanate with or without chlorine substituents.

The following examples are presented to define the invention more fully without any intention of being limited thereby. All parts and percentages are by weight unless otherwise specified.

*Example I*

Toluenediamine (183.2 g.) in o-dichlorobenzene (1500 g.) was treated with anhydrous hydrogen chloride at 90—100° C. to form toluenediamine dihydrochloride. Phosgene was then passed through the solution at 135–140° C. to form toluene diisocyanate. After removal of the o-dichlorobenzene solvent by vacuum distillation at 40° C., 284 g. of crude product was obtained. Vacuum distillation of 127.5 g. of the crude product at 1–2 mm. resulted in the recovery of 70.4 g. toluene diisocyanate (55 percent of the crude product). Approximately 45.5 g. of hard, intractable resin remained in the distillation flask.

A 50 g. portion of the crude toluene diisocyanate was extracted with one 200-ml. and two 50-ml. portions of n-pentane. Evaporation of the combined pentane extracts yielded 30.8 g. toluene diisocyanate (61.6 percent of the crude product). Approximately 19.1 g. of insoluble resinous material was recovered in the form of a viscous liquid tar. Thus it can be seen that the use of pentane solvent increased the yield of toluene diisocyanate from 55 to 61.6 percent. In addition, when no pentane was used, the residue solidified and the resulting solid was difficult to remove from the distillation equipment. In contrast, when pentane was used, the residue was liquid, and thus was more easily removed.

*Example II*

Toluenediamine was reacted with phosgene in the presence of o-dichlorobenzene to yield a crude toluene diisocyanate solution containing about 10 percent toluene diisocyanate. This solution was subjected to flash distillation at a temperature of 130° C., which yielded 231.9 grams of toluene diisocyanate as the distillate and 84 grams of a viscous black residue. The residue was extracted with four 50-ml. portions of hexane. The extractants were combined and distilled to yield 23 grams of toluene diisocyanate, and a black viscous tar residue which weighed 58 grams. The total toluene diisocyanate obtained by combining both fractions recovered was 254.9 grams, which was equivalent to 82.2 percent of the theoretical toluene diisocyanate content.

Various modifications of the invention, some of which have been referred to above, may be employed without departing from the spirit of the invention. Therefore I do not wish to be limited except by the appended claims.

I claim:

1. A process for the recovery of organic isocyanate from a crude reaction mixture containing organic isocyanate and impurities which comprises admixing with said crude reaction mixture an inert liquid solvent for said organic isocyanate, the impurities in said crude reaction mixture being substantially insoluble in said solvent, whereby a first liquid phase and a second liquid phase are formed, said first liquid phase containing said organic isocyanate and said solvent, and said second liquid phase containing the impurities, and separating said first liquid phase from said second liquid phase.

2. A process for recovery of organic isocyanate from a crude reaction mixture containing said organic isocyanate, an inert diluent, and impurities which comprises heating said crude mixture to distill said inert diluent therefrom, leaving a residue containing said organic isocyanate and said impurities, admixing with said residue an inert organic solvent for said organic isocyanate to yield a liquid phase of said organic solvent containing said organic isocyanate, separating said liquid phase from said impurities, and distilling said liquid phase to separate said organic isocyanate from said inert organic solvent.

3. The process of claim 2 wherein the proportion of said inert liquid solvent is between about 50 and 500 percent by weight of the organic isocyanate.

4. The process of claim 2 wherein said organic isocyanate is toluene diisocyanate.

5. The process of claim 2 wherein said inert organic solvent is pentane.

6. The process of claim 2 wherein said organic solvent is hexane.

7. A process for the recovery of organic isocyanate from a crude reaction mixture containing said organic isocyanate, impurities, and an inert diluent which comprises heating said crude reaction mixture in a first distillation step to yield a vapor phase containing a portion of said organic isocyanate and substantially all of said inert organic diluent, and a first distillation residue containing said impurities and a portion of said organic isocyanate, admixing said first distillation residue with an inert organic solvent capable of dissolving said organic isocyanate to yield a liquid phase of said organic solvent containing said organic isocyanate, separating said liquid phase from said impurities, distilling said liquid phase to separate said organic isocyanate from said inert organic solvent and recovering said organic isocyanate from the vapor phase produced in said first distillation step by condensing said vapor phase to yield a liquid fraction predominating in said organic isocyanate.

8. The process of claim 7 wherein the proportion of said inert liquid solvent is between about 50 and 500 percent by weight of the organic isocyanate in said residue.

9. The process of claim 7 wherein said organic isocyanate is toluene diisocyanate.

10. The process of claim 7 wherein said inert organic solvent is pentane.

11. The process of claim 7 wherein said organic solvent is hexane.

References Cited by the Examiner

UNITED STATES PATENTS

| 2,453,472 | 11/48 | Teter | 202—60 |
| 2,614,971 | 10/52 | Burton | 202—60 |
| 2,625,561 | 1/54 | Werntz. | |
| 2,884,359 | 4/59 | Bloom et al. | 202—74 X |
| 2,889,257 | 6/59 | Griffin et al. | 202—74 |
| 3,040,002 | 6/62 | Aldridge. | |

FOREIGN PATENTS 887,874  1/62  Great Britain.

ROBERT F. BURNETT, *Primary Examiner.*

NORMAN YUDKOFF, *Examiner.*